(12) United States Patent
Eckardt et al.

(10) Patent No.: US 6,491,877 B1
(45) Date of Patent: Dec. 10, 2002

(54) METHOD AND DEVICE FOR INITIATING A HYDROGEN/OXYGEN REACTION IN A REACTOR SAFETY VESSEL

(75) Inventors: Bernd Eckardt, Bruchkoebel; Axel Hill, Stockstadt, both of (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/265,152

(22) Filed: Mar. 9, 1999

Related U.S. Application Data

(63) Continuation of application No. PCT/DE97/01861, filed on Aug. 27, 1997.

(30) Foreign Application Priority Data

Sep. 9, 1996 (DE) .......................................... 196 36 555

(51) Int. Cl.[7] .............................. G21C 9/00; G21C 9/06; B01J 32/00
(52) U.S. Cl. .................. 422/174; 422/175; 422/177; 376/300; 376/301
(58) Field of Search ................................. 376/300, 301; 423/580.1, 580.2; 422/174, 177, 175, 199, 206; 219/530, 540, 543, 260

(56) References Cited

U.S. PATENT DOCUMENTS

| | | | | |
|---|---|---|---|---|
| 3,770,389 A | * | 11/1973 | Kitzner et al. | 422/174 |
| 3,873,440 A | | 3/1975 | Hallman | 208/108 |
| 3,984,980 A | * | 10/1976 | Wise | 60/517 |
| 4,014,984 A | | 3/1977 | Parnes | 423/580.1 |
| 4,563,672 A | * | 1/1986 | Anderson | 340/512 |
| 4,631,164 A | * | 12/1986 | Heck | 376/300 |
| 4,762,093 A | | 8/1988 | McCabe et al. | 123/3 |
| 4,780,271 A | | 10/1988 | Dezubay et al. | 376/300 |
| 5,301,217 A | * | 4/1994 | Heck et al. | 376/301 |
| 5,417,062 A | * | 5/1995 | Swars et al. | 60/300 |

FOREIGN PATENT DOCUMENTS

| | | |
|---|---|---|
| DE | 30 04 677 A1 | 8/1981 |
| DE | 31 43 989 C1 | 2/1983 |
| DE | 35 33 140 A1 | 3/1987 |
| DE | 36 14 267 A1 | 10/1987 |
| DE | 36 04 416 C2 | 4/1990 |
| DE | 40 15 228 A1 | 11/1991 |
| DE | 41 25 085 A1 | 2/1993 |
| DE | 43 19 973 A1 | 2/1995 |
| DE | 195 30 749 A1 | 3/1997 |
| EP | 0 301 536 A2 | 7/1987 |
| EP | 0 303 144 A1 | 2/1989 |
| FR | 2 501 529 | 9/1982 |

OTHER PUBLICATIONS

International Publication No. WO 91/18398 (Heck et al.), dated Nov. 28, 1991.
Patent Abstracts of Japan No. 07–019035 (Kenji), dated Jan. 20, 1995.

* cited by examiner

Primary Examiner—Hien Tran
(74) Attorney, Agent, or Firm—Laurence A. Greenberg; Werner H. Stemer; Gregory L. Mayback

(57) ABSTRACT

A hydrogen/oxygen reaction is initiated in a catalytic recombination or ignition device. The device has one or more catalyst bodies with a predetermined catalytic surface. Only a small portion of the entire available catalytic surface, preferably less than 5% of the surface, is permanently maintained at a temperature level above ambient temperature. The temperature is raised by introducing energy with a heater. The heated surface portion acts as an initial igniter.

16 Claims, 4 Drawing Sheets

METHOD AND DEVICE FOR INITIATING A HYDROGEN/OXYGEN REACTION IN A REACTOR SAFETY VESSEL

CROSS-REFERENCE TO RELATED APPLICATION

This application is a continuation of copending International application No. PCT/DE97/01861, filed Aug. 27, 1997, which designated the United States.

BACKGROUND OF THE INVENTION

Field of the Invention

The invention relates to a method and a device for initiating a hydrogen/oxygen reaction in a catalytic recombination or ignition device equipped with at least one catalyst body formed with a predetermined catalytically active surface.

Catalytic ignition devices are described, for example, in the European patent application EP 0 303 144 A1 and in the German patent application. DE 30 04 677 A1. A catalytic recombination device is known, for example, from the European patent application EP 0 527 968 A1.

After an incident involving a coolant loss in a nuclear power plant, large quantities of hydrogen $H_2$ and carbon monoxide CO may be released into the safety vessel. Unless proper countermeasures are taken, the hydrogen enrichment in the atmosphere of the safety vessel containment would, under some circumstances, be possible to such an extent that an explosive mixture could be formed. In the event of late accidental ignition, the structural integrity of the safety vessel could be compromised and put at risk, above all due to the combustion of a relatively large quantity of hydrogen. Consequently, efforts are being made to eliminate the hydrogen and carbon monoxide from the atmosphere of the safety vessel by recombination with oxygen $O_2$. The efforts are directed towards developing and optimizing a recombination or ignition device that starts early. Such a device should not lose its activity to any appreciable extent even in the event of a relatively long operating period in the atmosphere of the safety vessel. It should further be capable of starting completely passively at low ambient temperatures. In other words, it is to be possible to operate a catalytic recombination or ignition device passively and with a fast start even in the event of incidents at low ambient temperatures, for example in the case of TMI incidents with the ventilation being in operation and with resulting ambient temperatures of only 30° C. or else under ice condenser conditions of, for example, 10° C. and below. If it is possible for the hydrogen to be reduced passively in good time, the safety of the nuclear power plant is increased decisively. Conventional catalytic recombination or ignition devices work with catalyst elements based on platinum and/or palladium. It is the object to increase the reaction starting safety decisively even when reversible catalyst poisons are present.

A prior art recombination device for the recombination of hydrogen and oxygen is described in the European patent EP 0 527 986 C1. In one embodiment of that specification, a plurality of catalyst plates are arranged parallel to one another in a housing. The housing is formed with an inflow orifice and an outflow orifice, such that the gas/vapor mixture, which, during the incident, contains the hydrogen to be eliminated, flows in parallel through the mutually parallel catalyst plates. The device is intended, in particular, for use after serious incidents, in which temperatures of more than 50° C. in the atmosphere of the safety vessel must be expected. It would be desirable to design such a device in such a way that it starts reliably even at lower temperatures.

The foregoing publication describes platinum and palladium catalyst systems. The state of the art knows several other embodiments. For example, the German patent DE 36 94 416 C2 describes homogeneously distributed precious metal mixtures. It is also possible, for example, for a plurality of precious metal foils (Pd+V+Pd) to be applied to an aluminum carrier body in a sandwich design and to be wound in spirals. Also, the European patent application EP 0,301,536 A2 describes devices, in which a palladium alloy (with a short response time to catalytic reaction) is used. The palladium alloy contains at least 80% by weight of Pd, no more than 19.9% by weight of a further metal of the 8th group of the periodic system, in particular nickel, and no more than 10% by weight of copper.

Due to the relatively great microscopic distance between the sensitive palladium centers and the poison-resistant platinum centers that are predominantly present, other catalyst mixtures cannot generate sufficient reaction rates at the low temperatures under consideration here, so that a light-off of the platinum centers cannot be achieved.

According to the prior art, to avoid deactivation, the above-described devices may also be equipped with filters or be stored in closed vessels which are opened if so required. Such additional devices, although avoiding or reducing catalyst aging, are very costly and complicated and can be designed only with difficulty in the light of other requirements, such as, for example, earthquakes.

It has become known from the German patent DE 31 43 989 C to use a recombination device which comprises as a whole a vessel and an electrical heating system. No details with regard to the design are provided by the publication.

SUMMARY OF THE INVENTION

It is accordingly an object of the invention to provide a method and a device for the early initiation of a hydrogen/oxygen reaction in a catalytic recombination or ignition device, which overcomes the above-mentioned disadvantages of the heretofore-known devices and methods of this general type and which render it possible for the hydrogen to be reduced passively in good time and, as a consequence, to increase the safety of the system. The device is to operate reliably under the most difficult accident conditions, in particular in catalytic ignition or recombination devices which are mounted within the safety vessel of a nuclear power plant and which operate mainly with the use of the precious metals palladium and platinum.

With the foregoing and other objects in view there is provided, in accordance with the invention, a method of initiating a hydrogen/oxygen reaction in a catalytic recombination or ignition device, in particular for a nuclear power plant. The catalytic recombination or ignition device having at least one catalyst body with a predetermined catalytic surface. The method comprises the following steps:

introducing energy into a catalyst body and permanently maintaining only a portion of a predetermined catalytic surface of the catalyst body at a temperature above ambient temperature. In a preferred embodiment, less than 5% of the surface is maintained at the elevated temperature.

There is also provided, in accordance with the invention, a combination of a catalytic recombination or ignition device having a number of catalyst bodies with a predetermined catalytic surface and a device for initiating a hydrogen/oxygen reaction in the catalytic recombination or ignition device. The combination comprises an energy feed device connected to the catalytic recombination or ignition device for introducing energy and permanently maintaining a portion of the predetermined catalytic surface, preferably less than 5% of the surface, at a temperature level above an ambient temperature.

The infeed of energy and the associated rise in temperature to a temperature level above that of the ambient temperature afford favorable reaction conditions for the hydrogen/oxygen reaction. In an incident, the sequence of the reaction is initiated in the said small portion of the surface as a consequence of the increased surface temperature. Further measures, which are defined in various dependent claims herein, ensure that the initial reaction can spread particularly quickly to the entire surface.

In accordance with an added feature of the invention, the energy is procured from a local energy store, such as a battery.

In accordance with an additional feature of the invention, the energy is introduced by permanently heating an electrical heating device or by heating a catalytically active zone.

In the preferred application of the invention, the recombination or ignition device is placed in a containment of a nuclear power plant.

In accordance with a further feature of the invention, the small portion of the catalytic surface is maintained at a temperature of more than 50° C., preferably above 80° C.

In accordance with again an added feature of the invention, the energy is procured from a central current supply device and, in an event of a failure of the central current supply device, a switch-over is effected to the local energy store.

In accordance with again another feature of the invention, a heat content is delivered via a heat transport element connected to a storage device (with liquid or solid energy storage material), and the storage device is heated and permanently maintained at an increased temperature, preferably above 200° C.

The term "local energy store" herein used means that the device is disposed in close vicinity of the catalytic surface. A battery, for instance, may be disposed directly at the housing of the recombination or ignition device. Thus, even in the event of an incident-related failure of the power plant current supply and in the presence of low temperatures, for example, below 10° C., along with low hydrogen concentrations of, for example, less than 2% by volume, in the case of a highly contaminated atmosphere, in the case of moisture, etc., it becomes possible to achieve a completely passive start of the catalytic reaction. The diversion of the heat of reaction into adjacent catalytic surfaces makes it possible to activate the complete catalytic ignition or recombination device. Oxidation of the hydrogen can thus take place in good time before critical concentration limit values are reached. A decisive increase in safety in a nuclear power plant is consequently achieved.

In other words, the permanent control of the temperature of the catalytic part makes it possible, when hydrogen is released, for the heated catalyst zone to be further heated spontaneously, due to the exothermic reaction which starts immediately, and to set in motion a self-assisting catalytic reaction. The reaction, possibly assisted via metallic conductors strategically disposed in the device, is transferred into the adjacent catalyst parts. This allows a global onset of the reaction.

Due to partial heating by means of an independent energy store system and due to the combination of the measures specified, aging effects, brought about by use in the atmosphere of the nuclear power plant, such as, for example, by the sorption of hydrocarbons and welding vapors, aerosol pollution, etc., can be compensated for long operating periods of many years, without the loss, otherwise occurring after a short stand-by time, of the self-starter function which is important for safety. These operating periods may cover five years or more. Safety is therefore decisively increased, and, at the same time, costs are reduced, since a cyclic exchange of the individual catalyst bodies becomes unnecessary.

Although the invention is illustrated and described herein as embodied in method and device for initiating a hydrogen/oxygen reaction in a reactor safety vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
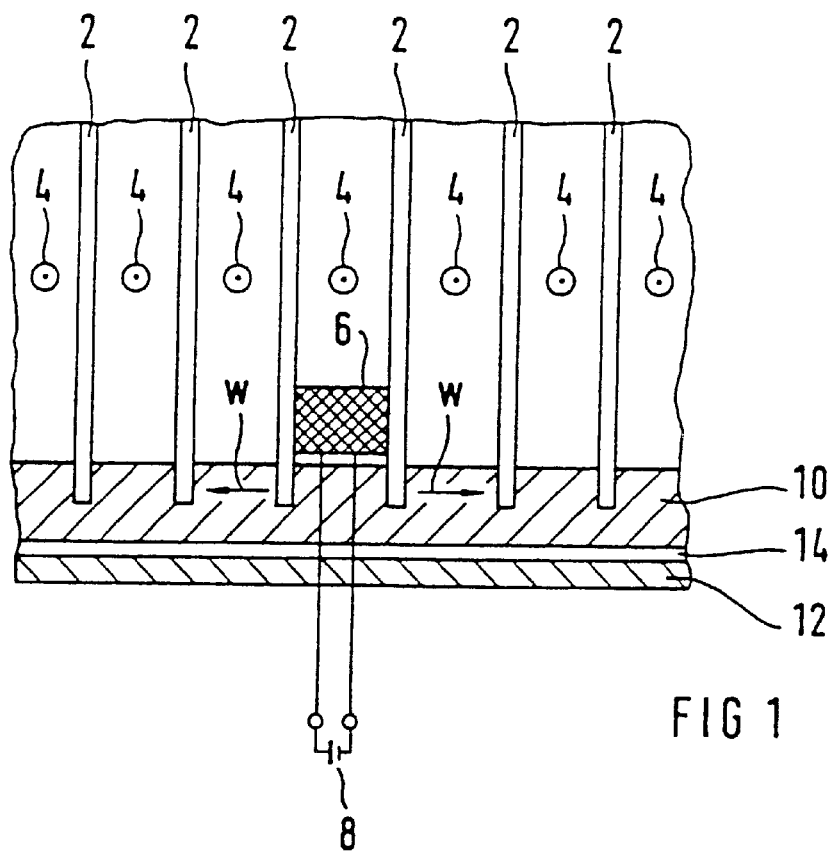
FIG. 1 is a top view of a detail of a catalytic recombination device.

Referring now to the figures of the drawing in detail and first, particularly, to FIG. 1 thereof, there is seen a catalytic recombination device. The gas to be recombined emerges out of the paper plane from below, as indicated by the vector heads 4. An electrical heating device 6, that is to say a permanently heated catalytically active zone, is located in the front region between two central catalyst bodies 2. The heating device 6 may be a small heating body, such as a heating bar, a filament or another heating element. The electrical heater 6 is supplied by an energy source 8, for example by a local energy store, such as a battery. The heating device 6 is arranged in such a way that it transfers heat energy to the two adjacent catalyst bodies 2 (in the middle of the drawing figure). The further heat transfer is indicated with the arrows w. The volume and heating capacity are dimensioned such that only a small part of the entire available catalytic surface, preferably less than 5% of the surface, is maintained permanently at a temperature level above ambient temperature by the introduction of heat energy. The permanent heating of the central surface part is carried out in such a way that temperatures of more than 50° C., advantageously of more than 80° C., are maintained within this zone. The decrease, known as aging, in catalytic activity which, at increased temperatures, is decisively reduced over time, for example due to the sorption of pollutants from the containment atmosphere during the continuous operation of the nuclear power plant, is decisively minimized.

According to FIG. 1, the recombination device comprises a multiplicity of mutually parallel catalyst plates or catalyst bodies 2. Each of the catalyst bodies 2, as described in the European patent EP 0 527 968 C1, comprises a baseplate made from sheet steel and of catalytic material, such as platinum and palladium, applied on both sides. The individual catalyst bodies 2, which, as a whole, possess a predetermined catalytic surface, are braced in form-lock (positive) and friction lock (non-positive) in a metallic carrier 10. They have a plate spacing of less than 2 cm, preferably of about 1 cm. It is desirable for the spacing between the catalyst plates to be maintained within the framework of these values, since, on account of the laminar flow states between the plate-shaped catalyst bodies 2, there is only insufficient heat transfer by convection and the heat is transferred primarily by radiation. Due to the non-positive friction lock of more than 0.1 kp between each individual catalyst body 2 (thickness about 0.05 mm) and the carrier 10, direct further heat transfer into the adjacent catalyst body 2 occurs after the starting of the catalyst.

The further heat transfer in the metallic carrier 10 is identified by the horizontal arrows w.

Cooling influences caused by the surroundings is kept at a low level by an insulating air gap 14, through which the flow does not pass. The air gap 14 is provided between the housing wall 12 and the metallic carrier 10. The air gap may have a width of more than 5 mm. Instead of an air gap 14, a solid insulating layer may also be provided. The recombinator outer temperatures are reduced by means of the air gap 14, so that, if ignition is not desired and if there are relatively high hydrogen concentrations of, for example, 8 to 10% by volume, it becomes possible for the device to operate without ignition.

Figure 2:
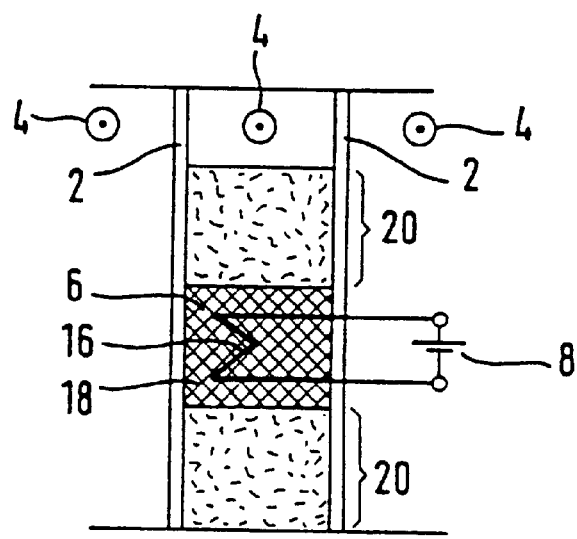
FIG. 2 is a similar view of a modified embodiment of the arrangement of the heating device.

With reference to FIG. 2, an electrically heatable heating body 6 is arranged once more between two catalyst bodies 2 of a catalytic recombination device. The heating body 6 consists essentially of a heating coil 16, which is supplied by the energy source 8, and of a wire mesh 18 which lies around it and which is a good heat conductor and transfers the heat generated permanently by the heating coil 16 on to the two catalyst bodies 2. For this purpose, the wire mesh 18 rests firmly on the surface of the two plate-shaped catalyst bodies 2. Instead, here too, a catalytically heatable element 16 or 18 may again be used. The heating body 6 is surrounded on both sides by filter bodies 20. The filter bodies 20 consist of a metallic filter fleece and/or sorption medium, such as, for example, activated charcoal or zeolite. The filter bodies 20 ensure that the incidents of aerosol-like and/or gaseous pollutants in this sensitive zone can be kept low.

Figure 3:
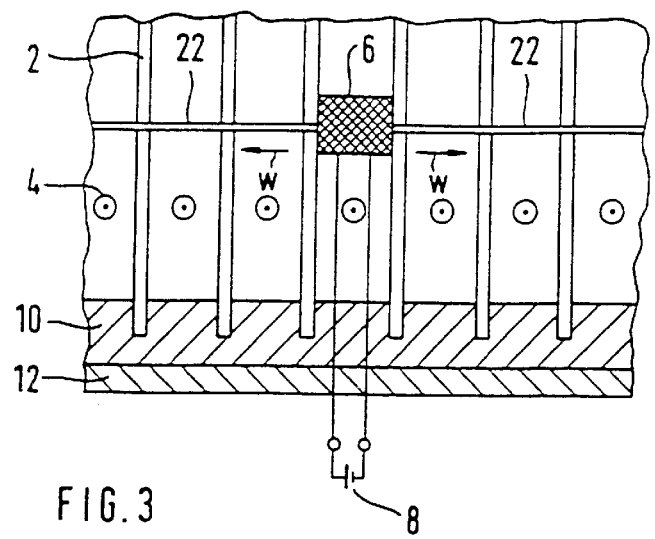
FIG. 3 is a top view of a detail of an embodiment using heat conductors.

Referring now to FIG. 3, the heat is transferred on to further catalyst bodies 2 from the zone of the two adjacent catalyst bodies 2 heated by the heating device 6. This purpose is served by heat transport elements 22 which, in particular, are rod-shaped or plate-shaped and consist of metal. They may extend over a plurality of catalyst bodies 2. Here too, heat conduction is identified by the arrows w.

Figure 4:
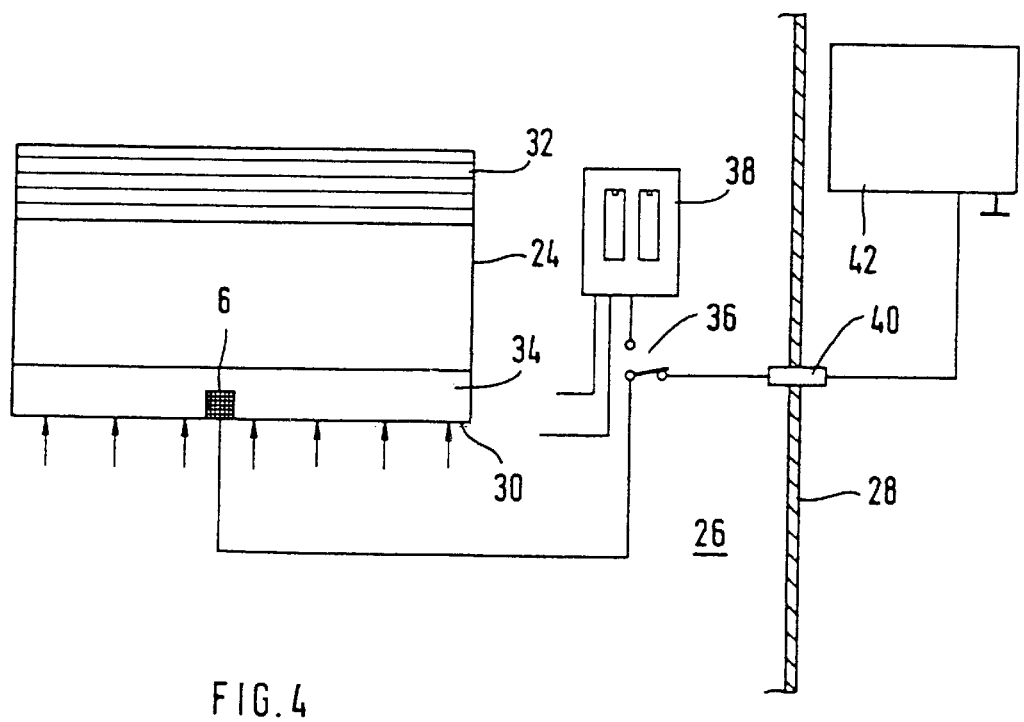
FIG. 4 is diagrammatic view of the external and internal electricity supply of the heating system in a nuclear power plant.

Referring now to FIG. 4, there is shown a recombination device 24 within a reactor safety vessel 26 (containment 26). The containment wall of the latter in designated by 28. The recombination device 24 is designed, in particular, as shown and described in the European patent EP 0 527 968 C. Here, however, mutually parallel plates 2 are employed. The inlet orifice is marked by 30 and the outlet orifice arranged perpendicularly thereto is marked by 32. The plate-shaped catalyst bodies 2 aligned parallel to one another are located in the lower region 34. The heating body 6 is also accommodated here. The latter is supplied, via a change-over switch, trip switch, or switching element 36, either by an internal electricity supply unit 38 in the event of an incident or, by way of a lead-through 40 in the wall 28, by an external electricity supply unit 42 for normal operation. The change-over switch 36 can be actuated in such a way that only in the event of a failure of the external electricity supply unit 42 is a change-over made from this to the internal electricity supply unit 38.

Figure 5:
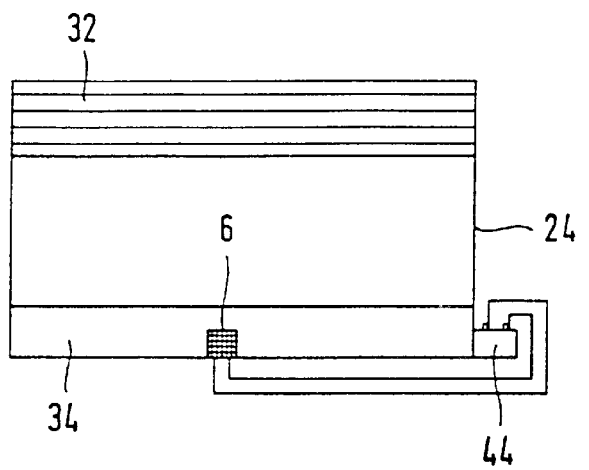
FIG. 5 is a diagrammatic view of a non-central incident-proof energy supply.

As shown in FIG. 5, the heating element 6 in the recombination device 24 may be supplied permanently by a radiation-resistant battery 44 which is arranged in or directly next to the device 24. This is, therefore, a decentral incident-proof energy supply, and the battery 44 may be referred to as a local energy store.

The following should be appreciated with regard to FIGS. 4 and 5: The partial heating minimizes the necessary energy requirement, in particular in incident situations, to such an extent, for example to less than 100 W, preferably to less than 10 W, that it is possible for energy to be introduced from the energy store 38, 44 over a period of several hours.

In the embodiment of FIG. 5, the energy store arranged within the reactor safety vessel 26 consists of one or more separate electrical batteries 44 which, in the event of a failure of the current supply over a specific period of more than 2 hours, preferably of more than 24 hours, come into operation automatically and maintain the heating and temperature control of the active catalyst zone.

Figure 6:
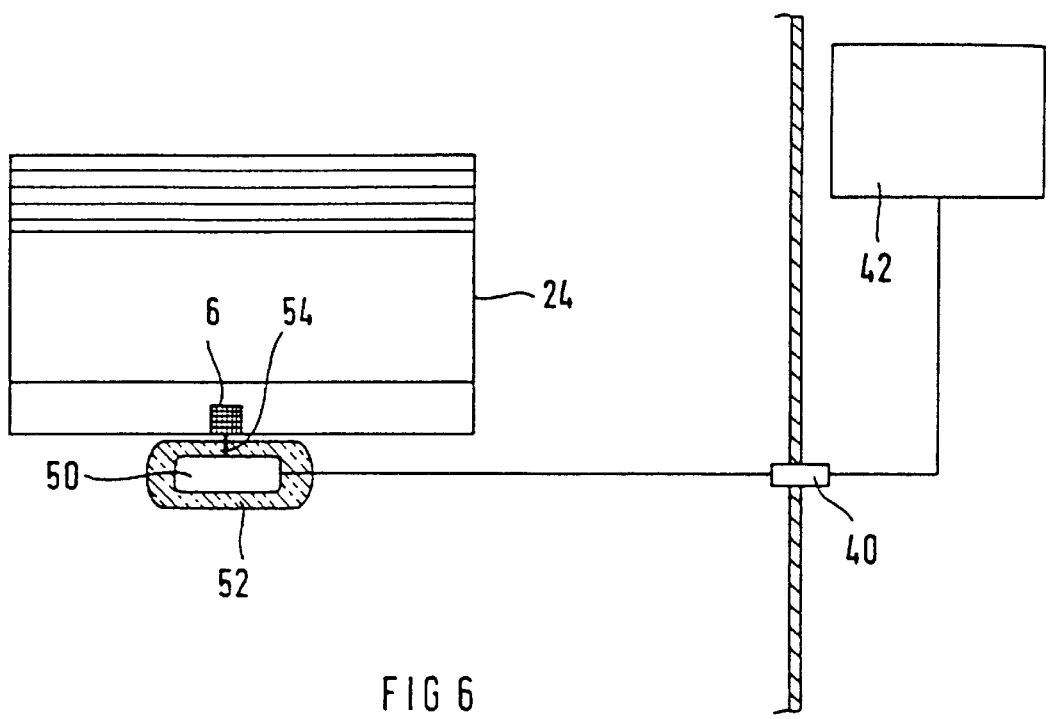
FIG. 6 is a diagrammatic view of heating by means of a heat store.

Referring now to FIG. 6, the recombination device 24 may be provided with a storage device 50 for heat, also referred to herein as a heat store 50. The heat store 50 contains a liquid or solid heat storage material. The storage device 50 is maintained permanently at an increased temperature of more than 200° C., preferably more than 400° C., by means of electric resistance heating. The necessary energy injection is effected from an external electricity supply device 42. In order to keep the heat losses low, the store 50 is surrounded by an incident-proof insulation 52, in particular a vacuum insulation or solid insulation. Heat is transported from the heat store 50 to the heating element 6 in the unit 24 by direct heat conduction, specifically via an insulated heat transport element 54, for example a metal rod. If the supply line between the resistance heating in the heat store 50 and the external supply 42 is interrupted, the stored heat is sufficient to keep a predetermined small area of the catalytic surface at an increased temperature, specifically for a period of hours. Here too, the-passive initial-igniter catalyst part is arranged, counter to the direction of flow, in the lower part or region 34 of the device 24.

Figure 7:
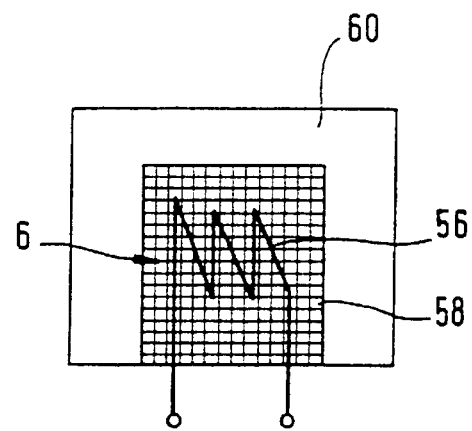
FIG. 7 is a diagrammatic view of heatable catalyst element.

Referring now to FIG. 7, there is shown a heatable heating element 6 which comprises a heating coil 56 or a catalytically coated filament and a wire mesh 58 or a catalytically coated filter fleece. The latter rests on a fastening or retaining means 60 or directly on the plane catalyst body 2.

Figure 8:
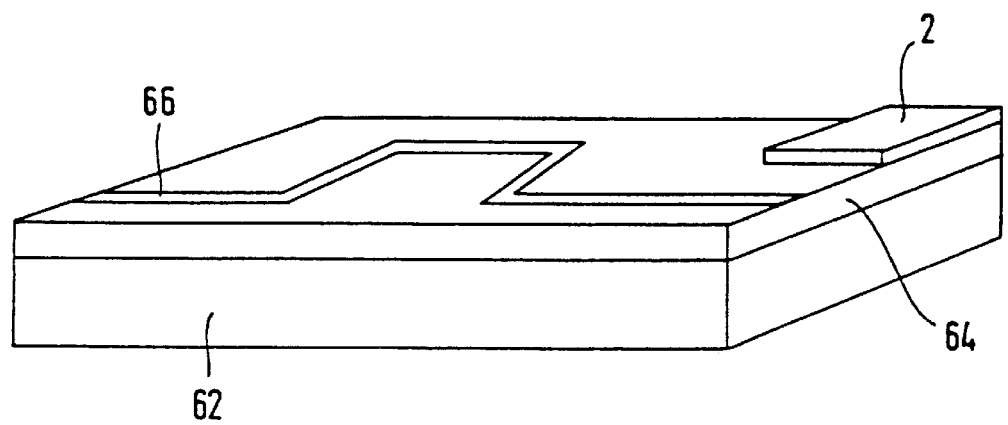
FIG. 8 is a perspective view of a heating conductor disposed parallel to a catalyst plate.

Referring, finally, to FIG. 8, the electrically heated heating element 6 may be integrated to a greater or lesser extent into the catalyst body 2 or it may rest directly on the catalyst body. The latter instance is shown here. A plate-shaped carrier body 62, for instance an austenitic metal foil, is covered by an electrical insulating layer 64. A zigzag-shaped conductor track 66 for electrical heating is accommodated in the insulating layer 64. The plate-shaped catalyst body 2, only a portion of which is shown for the sake of greater clarity, rests on the insulating layer 64. Here again, the catalyst body 2 is a thin precious metal plate which is covered on top with a catalyst layer based on Pd/Pt.

Due to the relatively low energy requirement of the device illustrated in FIGS. 1 to 8, a combination with the supply of other measuring devices in the reactor safety vessel which are supplied with emergency current, such as, for example, with the supply for the purpose $H_2$ measurement, is possible. This signifies a comparatively low outlay.

To restore catalytic activity, a brief high-temperature phase of more than 200° C. (cyclic or else to be triggered by hand, for example within the framework of repeat tests) may additionally be triggered, for example by means of a trip switch 36 in FIG. 4. This achieves a highly effective reactivation of the heated catalytic part in the region of the heating element 6, so that, during continuous operation, heating at a markedly lower level is sufficient, since reversible catalyst poisons are qualitatively adsorbed.

We claim:

1. In combination with a catalytic device including at least one of a catalytic recombination device and a catalytic ignition device, the catalytic device having a number of catalyst bodies with a predetermined catalytic surface, a device for initiating. a hydrogen/oxygen reaction in the catalytic device, comprising: an energy feed device connected to the catalytic device for introducing energy and permanently maintaining a portion of said predetermined catalytic surface at a temperature level above an ambient temperature, said portion being less than 5% of said predetermined catalytic surface.

2. The combination according to claim 1, wherein said energy feed device comprises an electrical energy source electrically connected to an electrical heating device.

3. The combination according to claim 2, wherein said electrical energy source comprises a local energy store.

4. The combination according to claim 3, wherein said local energy store is a battery.

5. The combination according to claim 3, wherein said energy feed device further comprises a central current supply device and a change-over switch connected to said current supply device and to said local energy store, and said switch is configured to switch an energy supply of the catalytic device to said local energy store in an event of a failure of said central current supply device.

6. The combination according to 1, wherein said portion of said predetermined catalytic surface is disposed centrally within said number of catalyst bodies of the catalytic device.

7. The combination according to claim 1, which further comprises a heat conductor leading from said portion of said predetermined catalytic surface to another portion of said predetermined catalytic surface.

8. The combination according to claim 7, wherein said heat conductor is a metallic conductor.

9. The combination according to claim 1, wherein said energy feed device comprises a storage device with energy storage material selected from the group consisting of liquid and solid energy storage material, and a heat transport element thermally connecting said storage device to said portion of said predetermined catalytic surface.

10. The combination according to claim 9, which further comprises a heater for heating said storage device.

11. The combination according to claim 10, wherein said heater is an electrical resistance heater.

12. The combination according to claim 9, wherein storage device is a heat store surrounded by insulation.

13. The combination according to claim 10, wherein said heater is an electrical heating device with a permanently heated heating coil.

14. The combination according to claim 10, wherein said heater is a heating body disposed between two mutually adjacent catalyst bodies.

15. The combination according to claim 10, wherein each of said number of catalyst bodies is a plate, and said heater is a heating conductor track extending parallel to said plate.

16. The combination according to claim 10, which further comprises a housing surrounding said heater and the catalyst bodies.

\* \* \* \* \*